United States Patent [19]
Steyaert et al.

[11] Patent Number: 5,469,113
[45] Date of Patent: Nov. 21, 1995

[54] RECTIFIER AND INTEGRATOR CIRCUIT FOR DISK DRIVE SERVO SYSTEM

[75] Inventors: Michel Steyaert; Wim Dehaene, both Leuven; Jan Craninckx, Herent, all of Belgium; Mairtin Walsh; Peter Real, both of Limerick, Ireland

[73] Assignee: Analog Devices, Inc., Norwood, Mass.

[21] Appl. No.: 305,212

[22] Filed: Sep. 13, 1994

[51] Int. Cl.$^6$ .............................. G11B 5/596; H03D 1/02
[52] U.S. Cl. ...................... 329/311; 329/347; 360/77.08
[58] Field of Search .................................. 329/311, 347; 360/77.08, 77.07

[56] References Cited

U.S. PATENT DOCUMENTS

| | | | |
|---|---|---|---|
| 4,766,508 | 8/1988 | Mathewson | 360/77.07 |
| 4,910,616 | 3/1990 | Sirai et al. | 360/77.08 |
| 4,990,916 | 2/1991 | Wynne et al. | 341/147 |

OTHER PUBLICATIONS

Yager, C., "Trim head–positioning overhead with embedded disk servo", Electronic Design, pp. 83–90, Aug. 25, 1988.

*Primary Examiner*—Siegfried H. Grimm
*Attorney, Agent, or Firm*—Wolf, Greenfield & Sacks

[57] ABSTRACT

A servo system for controlling the position of a read/write head in a disk drive is provided. The servo system includes two input terminals for sequentially receiving a plurality of input signal AC voltage bursts of a burst pattern, wherein the input signal bursts include positional information of the head. Demodulation circuitry, coupled to the input terminals, sequentially demodulates each input signal burst and provides a demodulated signal for each burst. The demodulation circuitry includes translation circuitry, coupled to the input, for sequentially translating each input voltage burst to a translated current. A rectifier circuit, coupled to the translation circuitry, including an absolute value circuit and a current mirror circuit, sequentially rectifies each translated current and produces a driving signal. An integrator, coupled to the rectifier circuit, sequentially integrates each driving signal. The integrator includes an integration capacitor which is sequentially charged by each driving signal. In the preferred embodiment, the current mirror circuit includes an operational amplifier and a gain circuit. Also in the preferred embodiment, the voltage to current translation circuit includes a folded cascode circuit arrangement of a plurality of CMOS transistors.

7 Claims, 7 Drawing Sheets

RECTIFIER AND INTEGRATOR CIRCUIT FOR DISK DRIVE SERVO SYSTEM

FIELD OF THE INVENTION

The present invention relates to a servo system for controlling the position of a read/write head in a disk drive and, more particularly, to a demodulation circuit for rectifying and integrating input signal bursts containing head positional information.

BACKGROUND OF THE INVENTION

Servo systems are commonly used in disk drives to control the position of a read/write head. Head positional information is typically contained in tracking control signals which are stored on, and read from, a disk. Servo systems include analog demodulation circuitry for demodulating the tracking control signals and conversion circuitry for digitizing the demodulated signals. Digital circuitry processes the digitized signals and calculates a digital error signal representing the physical distance and/or direction between the desired and the actual head position. The error signal is converted to an analog voltage which is used to control and correct the position of the head.

Principally two approaches have been used to provide tracking control signals indicative of position on a disk surface. In the first approach, tracking control signals are stored on a separate surface (from that on which data is stored) of a multi-surface disk. In the second approach, in an effort to save disk space, it has become increasingly common for disk manufacturers to embed short duration servo bursts (tracking control signals) in dedicated servo areas interspersed between data storage areas, both on single-surface and on multi-surface disks. Typically, a repeated pattern of several (e.g., four) servo bursts is embedded on the disk. In each pattern, the bursts are substantially arranged along a track so that the bursts will be sequentially read if the head stays on the track. Each burst in the pattern is radially offset from the track and with respect to the other bursts. The relative amplitudes of the signal bursts (or, correspondingly, the integrated values of the detected bursts) read by the head provide information from which the head position (relative to the track) can be determined and, thus, is used to generate a positional error signal.

Prior art servo systems have been developed with circuitry for demodulating and digitizing embedded servo bursts. The demodulation circuitry of such systems typically includes circuitry for sequentially determining the amplitude of (or integrated area beneath) each signal burst within a pattern. The amplitude (or, as an alternative, the area) information for each burst is stored separately in the form of a detected analog voltage (or corresponding charge). Upon demodulation of the last burst of the pattern, conversion circuitry then sequentially digitizes and stores the analog voltage for each burst for subsequent head position correction.

One such prior art servo system is shown in FIG. 1 and includes input leads 10 and 12 for respectively receiving the differential, AC-coupled, input signals $V_{IN}+$ and $V_{IN}-$ from a read head which reads, for example, four sequential burst signals A, B, C and D of a pattern. Typical signal bursts A, B and C, as read by a head, are shown in FIG. 2 (burst D is not shown). The signal bursts A, B, C and D commonly have the same frequency, which generally ranges from 3–10 MHz. The signal bursts generally have the same amplitude on the disk but the signal bursts read from the disk by the head have different amplitudes (as shown in FIG. 2) due to the radial position of the head with respect the signal bursts (which are themselves radially offset from one another). In FIG. 1, area detect circuitry 14 separately and sequentially rectifies and integrates each burst to determine the "area" under each signal burst, and temporarily stores a voltage representing the area information. Analog-to-digital converter ("ADC") 26 then sequentially digitizes the stored voltages for the bursts A, B, C and D.

Area detect circuitry 14 includes a full-wave rectifier 18, an operational transconductance amplifier (OTA) 16, an integrator 20 and a stack 22 of four track-and-hold amplifiers (T/H) 22A–22D. As will be readily understood by those skilled in the art, the full-wave rectifier 18 rectifies the differential voltage received on leads 10 and 12 and provides the rectified voltages to OTA 16. OTA 16 then translates the rectified voltages to a driving current and provides the same to integrator 20. Integrator 20 integrates the driving current. Those skilled in the art will understand that integrator 20 includes a capacitor which is charged by the driving current signal and that the accumulated charge (and corresponding voltage) represents (i.e., is proportional to) the area beneath the driving current signal waveform. For each burst, a voltage representing the area is thus output by the integrator. Those skilled in the art will also appreciate that peak detect circuitry could alternatively be used to demodulate the signal bursts but that area detect circuitry is more immune to noise (e.g., spikes in the signal bursts).

The output voltages of the integrator for bursts A, B, C and D are stored in the four track-and-hold amplifiers T/H 22A, T/H 22B, T/H 22C and T/H 22D, respectively. For each burst, the output voltage of the integrator is "tracked" by a capacitor in the appropriate track-and-hold amplifier and, upon completion of the integration of that burst, the instantaneous voltage is "held" by the track-and-hold amplifier capacitor to enable subsequent digitization.

Upon demodulation of each of the bursts in the pattern, ADC 26 then sequentially converts to a digital signal each held analog voltage of a T/H 22A–22D. A multiplexer (not shown) sequentially provides the analog voltage outputs of the track-and-hold amplifiers along line 24 to ADC 26 for the bursts A, B, C and D. For each signal burst, the ADC 26 outputs a digital value (at a resolution of, e.g., 10-bits) representing the area information. The digital signal outputs of the ADC for the bursts A, B, C and D are sequentially fed along lines (or bus) 28 and stored in the registers labeled 30A, 30B, 30C and 30D, respectively, of register stack 30.

Once stored, the digital information is fed along lines (bus) 32 to microprocessor 34 which calculates an error signal. The error signal is provided on lines (bus) 36 to digital-to-analog converter ("DAC") 38. The DAC 38 provides an analog output signal along line 40 to DAC output amplifier 42 which, in turn, provides an output signal on line 44 to control and correct the head position (i.e., via a motor, not shown).

In such a prior art system, a delay occurs between the demodulation of each signal burst and the conversion of the demodulated signal burst. The delay occurs because a demodulated burst, burst A, for example, is not digitized until after each of the other bursts, bursts B, C and D in this example, has been demodulated. As a result of the delay, the read/write head may drift off the desired track. Additionally, the delay in conversion causes a delay in the positional correction of the head. Such effects may, in turn, cause faulty or inaccurate disk drive operation.

In addition to the delay in conversion, the area detect circuitry of such a prior art system can operate inaccurately. In particular, the voltage-mode full-wave rectifier can cause non-linearity errors. Additionally, the simple current mirror circuitry (consisting of multiple PMOS transistors) (not shown) used in the prior art demodulation circuitry can also cause non-linearity errors.

It is therefore a general object of the present invention to provide an improved servo system demodulation circuit for reducing non-linearity errors.

SUMMARY OF THE INVENTION

According to the present invention, demodulation circuitry for use in a servo system for controlling the position of a read/write head in a disk drive is provided. The demodulation circuitry includes two differential input terminals for sequentially receiving a plurality of input signal bursts of a burst pattern, wherein the input signal bursts include positional information of the head. The demodulation circuitry also includes translation circuitry, coupled to the inputs, for sequentially translating each input voltage burst to a translated current. A rectifier circuit, coupled to the translation circuitry, including an absolute value circuit and a current mirror circuit, sequentially rectifies each translated current and produces a driving signal. An integrator, coupled to the rectifier circuit, sequentially integrates each driving signal, More particularly, in accordance with the preferred embodiment of the present invention, the current mirror circuit includes an operational amplifier and a gain circuit.

In the preferred embodiment of the present invention, the voltage to current translation circuit includes a folded cascode circuit arrangement of a plurality of CMOS transistors.

A method for demodulating a plurality of input signal bursts of a burst pattern, according to the present invention, includes the steps of receiving the plurality of input bursts of the burst pattern; sequentially translating each input signal burst to a translated current; sequentially rectifying each translated current and producing a driving signal with an absolute value circuit and a current mirror circuit; and sequentially integrating each driving signal.

The demodulator can be implemented in a CMOS process which reduces cost without losing accuracy.

DETAILED DESCRIPTION

The area detect circuitry of the present invention includes a voltage to current translation circuit and a full-wave, current-mode rectifier having a current mirror circuit and an absolute value circuit. As explained in greater detail hereinafter, the current mirror circuit includes an operational amplifier and a gain circuit, and the voltage to current translation circuit includes a folded cascode arrangement of a multitude of CMOS transistors. The area detect circuitry achieves high linearity and accuracy while being cost-effective to implement in a low-cost CMOS process.

While the present invention is directed to area detect circuitry, also disclosed is a preferred pipelined demodulation scheme in which there is minimal delay between demodulation and conversion of each servo burst. The area detect circuitry of the invention can either be used with the prior art conversion scheme (described above with reference to FIG. 1) or the preferred pipelined scheme. The preferred pipelined scheme is discussed with reference to FIGS. 3 and 4.

Figure 3:
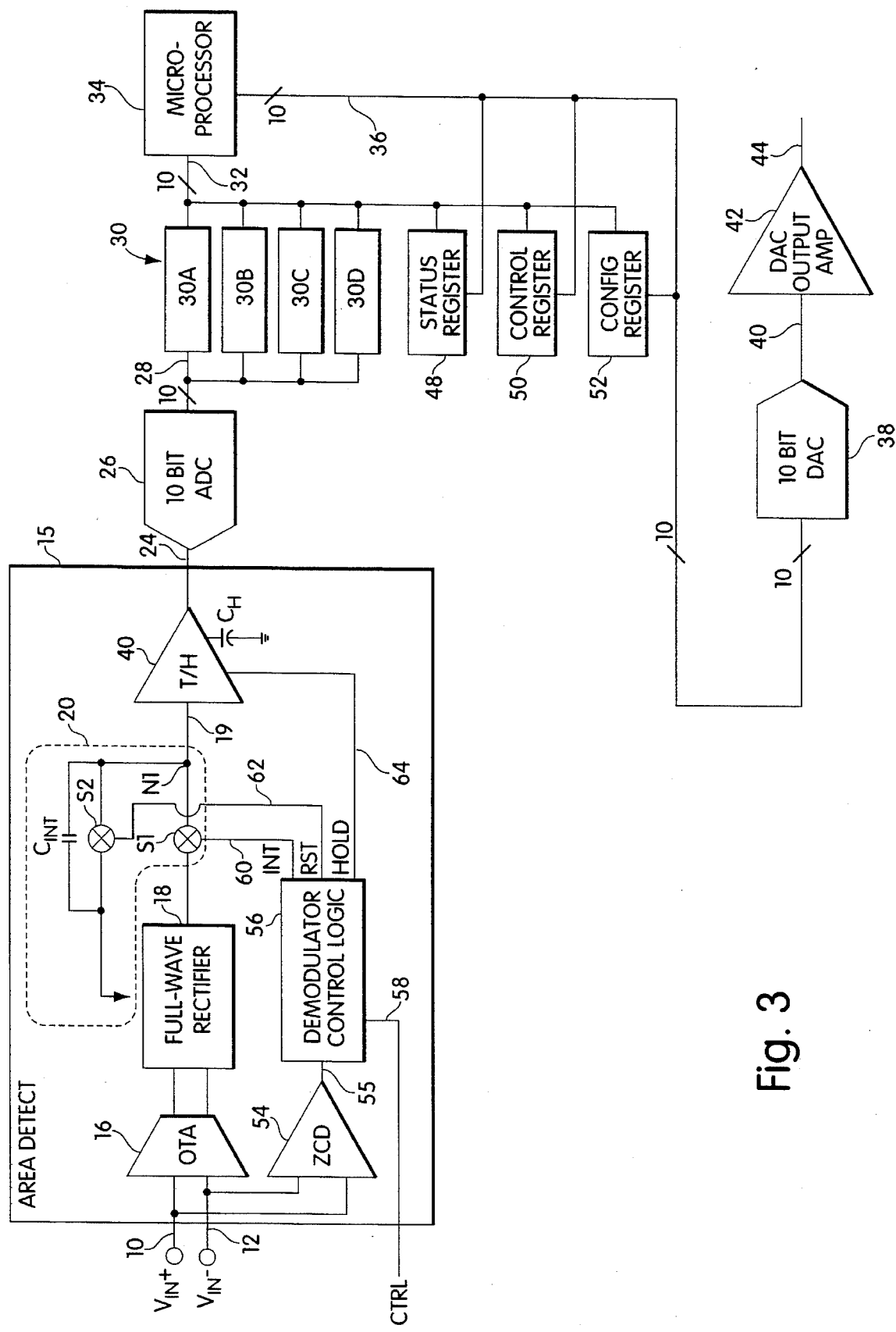
FIG. 3 is a partial schematic, partial block diagram of a servo system embodying the present invention.

As shown in FIG. 3, a servo system according to the invention includes area detect circuitry 15 and an ADC 26. During operation, the area detect circuitry 15 demodulates a first signal burst A of a pattern of bursts such as A, B, C and D (shown in the timing diagram of FIG. 4). Then, the ADC 26 digitizes the demodulated signal burst A while the area detect circuitry is demodulating the next sequential signal burst B. Such a demodulation and conversion routine continues until each signal burst A, B, C and D has been demodulated and digitized.

Figure 4:
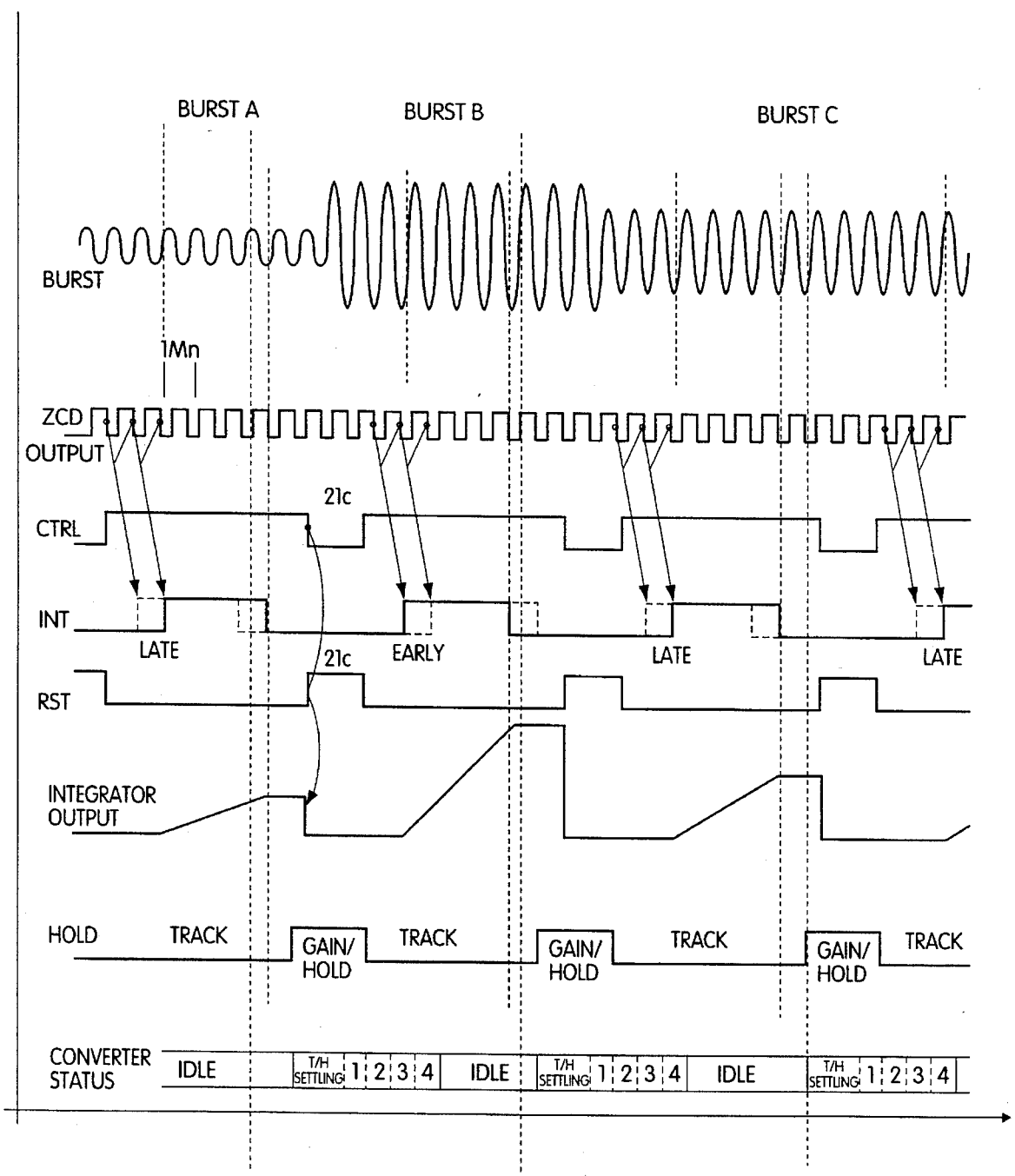
FIG. 4 is a timing diagram of various signals of the servo system of FIG. 3.

FIG. 4 is a timing diagram showing various signals associated with the servo system of FIG. 3. The signals are shown on the same time axis and the physical placement of one signal above another does not signify that one attains a higher voltage level than another. The relative amplitudes of the signals are, however, accurate. Three signal bursts A, B and C are shown in FIG. 4. Typically, four signal bursts are provided. Burst D is not shown, however, because the pipelined demodulation and conversion scheme can be readily understood by examining operation of the servo system on bursts A, B and C. As shown in FIG. 4, the bursts have the same frequency but different amplitudes.

Figure 1:
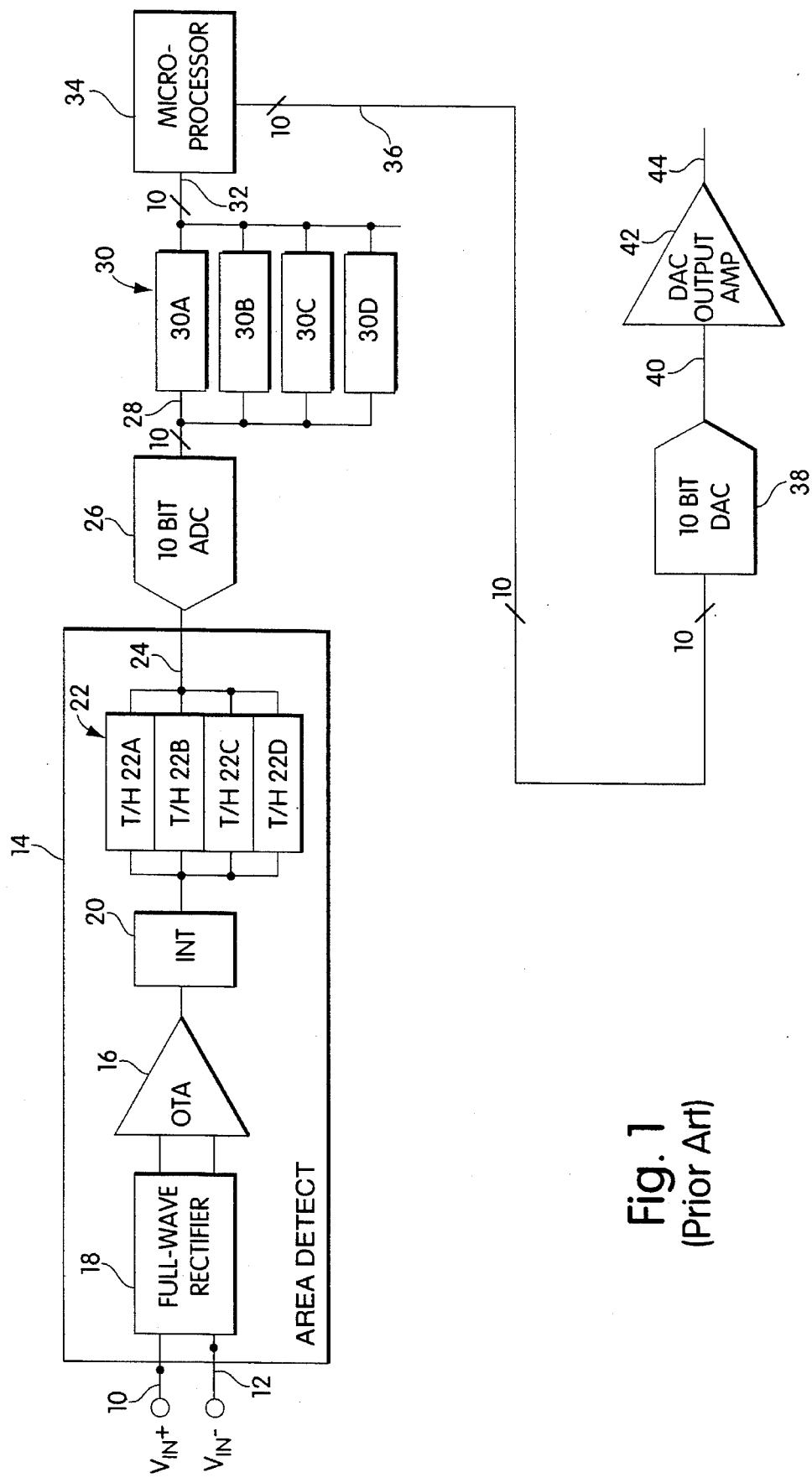
FIG. 1 is a block diagram of a prior art servo system.
Figure 2:
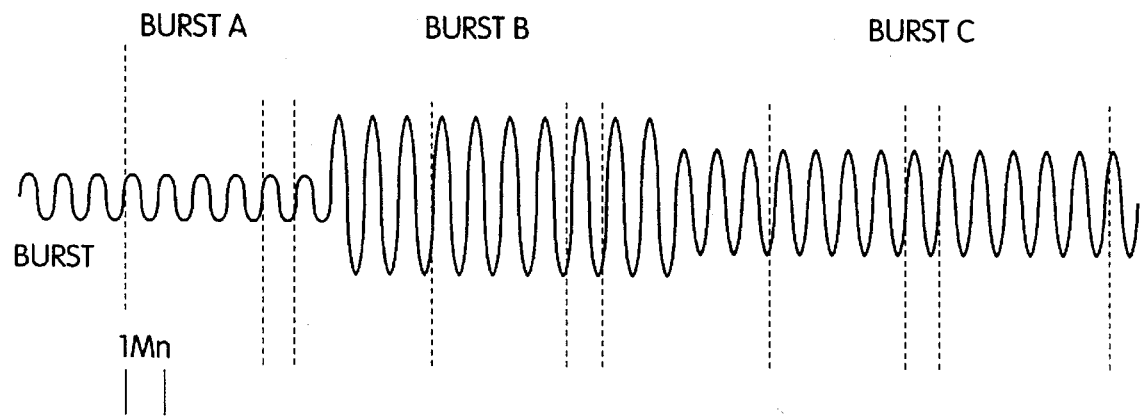
FIG. 2 is a timing diagram of typical burst signals read from a disk.

The system of the present invention, like the prior art system of FIG. 1, includes differential input leads 10 and 12 respectively receiving from the head the AC-coupled input voltages $V_{IN}+$ and $V_{IN}-$ of input signal bursts A, B, C and D. Area detect circuitry 15 determines the area beneath the waveform of each rectified signal burst A, B, C and D and provides an analog voltage signal, corresponding to the area, on line 24 to ADC 26. ADC 26 converts each analog signal to a digital signal (of, e.g., 10-bit resolution), which is provided on lines (bus) 28 to register stack 30, including registers 30A, 30B, 30C and 30D. Registers 30A, 30B, 30C and 30D respectively store the digitized area signals for bursts A, B, C and D. Microprocessor 34 receives the digitized area signals from register stack 30 on lines (bus) 32 and generates a digital position error signal.

As in the prior art system of FIG. 1, the microprocessor 34 provides the digital error signal on lines (bus) 36 to DAC 38 which, in turn, converts the digital error signal to an analog error voltage. The analog voltage is provided on line 40 to DAC output amplifier 42 which, in turn, provides an output signal on line 44 to control and correct the head position.

Unlike the prior art servo system, the area detect circuitry 15 of the servo system of the present invention includes an OTA 16 connected to the input leads 10 and 12, a full-wave rectifier 18 connected to the differential outputs of the OTA, and an integrator 20 connected to the output of the full-wave rectifier. The OTA 16, for each signal burst, translates the AC-coupled differential input voltage to a differential current. The full-wave rectifier 18 rectifies the differential current and outputs a rectified current signal. The preferred embodiment of the OTA 16 and the full-wave rectifier 18 will be described in greater detail hereinafter.

Integrator 20 generates a voltage representing the area beneath the rectified current signal. Track and hold amplifier 46 sequentially tracks and holds the area voltage generated by integrator 20 for each signal burst. The voltage held by track-and-hold amplifier 46 for each signal burst is then provided along line 24 to ADC 26 where it is subsequently converted to a digital signal (at a resolution of, e.g., 10-bits). Unlike the prior art system which included four track-and-hold amplifiers for simultaneously holding the voltages corresponding to the demodulated bursts before conversion of any of the voltages, the preferred system of the present invention includes only one track-and-hold amplifier, and conversion of each demodulated burst occurs almost immediately after demodulation of that burst. As will be apparent from the detailed description below, however, the area detect circuitry of the present invention could alternatively be used with a multitude (e.g., four) of track-and-hold amplifiers for simultaneously holding the voltages (a in the prior art system of FIG. 1).

As shown in detail in FIG. 3, integrator 20 includes a first switch S1 connected in series with in the output from full-wave rectifier 18 to line 19. An integrating capacitor $C_{INT}$ is connected between line 19 and ground, with the first plate of capacitor $C_{INT}$ connected to switch S1 and the second plate of capacitor $C_{INT}$ connected to ground. A second switch S2 is connected in parallel with $C_{INT}$, between the first plate of capacitor $C_{INT}$ and ground. The operations of switches S1 and S2 are controlled by the control signals INT and RST, respectively. Signals INT and RST are provided to switches S1 and S2 along lines 60 and 62, respectively.

As will be appreciated by those skilled in the art, when switch S1 is closed, the integrator is "on" and when switch S1 is opened, the integrator is "off". Switch S1 is closed when signal INT is high and is opened when signal INT is low. When switch S1 is closed and switch S2 is opened, the output current from full-wave rectifier 18 will flow through switch S1 and through integrating capacitor $C_{INT}$ to ground. Such action charges capacitor $C_{INT}$. The charge accumulated on capacitor $C_{INT}$ creates a voltage level across the capacitor representing the area beneath the current signal. Node $N_1$ will be at that voltage level (i.e., the output voltage of the integrator). When switch S1 is opened, charge can no longer flow through or onto capacitor $C_{INT}$. When switch S2 is closed, the charge on capacitor $C_{INT}$ is discharged to ground, to "reset" the integrator. Switch S2 is closed when signal RST is high and is opened when signal RST is low.

Track-and-hold amplifier 46 operates to "hold" the analog output voltage of the integrator, enabling the ADC to digitize that voltage. Track-and-hold amplifier (THA) 46 typically includes a capacitor $C_H$ connected between an internal node (not shown) and ground. As will be understood by those skilled in the art, the track-and-hold amplifier can operate in a "track" mode, during which the capacitor $C_H$ is charged by the input signal received on line 19 (and node $N_1$) and-the output of the THA follows its input, and a "hold" mode, during which the present charge on capacitor $C_H$ is maintained. The voltage on output line 24 corresponds to the charge maintained on capacitor $C_H$. The operating modes of the track-and-hold amplifier 46 are controlled by signal HOLD received on line 64.

Those skilled in the art will readily understand that information relating to the input signal bursts such as the number of bursts, the frequency of the bursts, and the number of cycles over which the area detect circuitry should integrate for each burst are design parameters provided by a user. Such parameters can be fixed or programed. The control register 50 stores a word, certain bits of which determine the number of cycles over which the integrator 20 should integrate for each burst. Thus, when the user provides the above information, a digital word representing the number of cycles over which the system should integrate is stored in the control register. The status register 48 stores a word, certain bits of which determine whether the integrator has integrated correctly for each of the bursts.

The user also provides signal CTRL (see FIG. 3) along line 58 to the demodulator control logic 56 which, in cooperation with the zero-crossing detector (ZCD) 54, insures that the correct number of complete cycles of the bursts are demodulated and integrated. Signal CTRL is a periodic signal that is high (at a voltage level recognized as "high") once during each signal burst for a certain number of cycles. For example, as shown in FIG. 4, the signal CTRL is high for 7.5 cycles of each burst and is low for two cycles of each burst. Once during each signal burst, while the signal CTRL is high, the demodulator control logic 56 is enabled and the integrator can then perform the integration (as described above).

The ZCD 54 is connected to the differential input leads 10 and 12 and receives the AC-coupled input voltages $V_{IN}+$ and $V_{IN}-$, respectively. The ZCD 54 produces a continuous pulse stream output (see FIG. 4) along line 55 to the demodulator control logic 56. The ZCD output is a periodic signal (when the burst information is presented periodically) including a falling edge each time the differential input signal crosses through zero volts. The ZCD output signal and the CTRL signal are used by the demodulator control logic 56 to generate the control signals INT and RST for controlling operation of the integrator. As described above, the integrator only integrates when signal INT is high and the integrating capacitor discharges (the integrator is reset) when signal RST is high.

The timing diagram of FIG. 4 shows the signals of the servo system for the example in which the user has programmed four cycles over which the integrator should integrate for each signal burst. When signal CTRL goes high during burst A, the demodulator control logic then counts two falling edges of the ZCD output before making signal INT high to begin integration of the burst. The demodulator control logic makes signal INT high upon the second falling edge of the ZCD output to insure that the ZCD output is valid and that the integrator starts integrating at a full cycle of the input signal burst. The demodulator control logic then counts four cycles (from falling edge to falling edge) of the ZCD output and makes signal INT low on the fourth falling edge to terminate the integration of the burst after the pre-programmed number of cycles. For this discussion, "cycles" refers to cycles of the input burst signal.

The asynchronous nature of signal CTRL and the ZCD output signal results in a range within which signal INT is made to go high, the range varying from one cycle to two cycles after each signal CTRL rising edge. Such a range is shown in the timing diagram of FIG. 4. As shown during burst A, the ZCD output falling edge occurs just before signal CTRL goes high. Therefore, the demodulator control logic counts two more subsequent falling edges of the ZCD output before making signal INT high. Such an occurrence is shown during burst A and is labeled "late" beneath signal INT. Alternatively, as shown during burst B, signal CTRL may go high just prior to the falling edge of the ZCD output. Therefore, that falling edge will be counted and signal INT will be made high on the subsequent falling edge of the ZCD output. Such an occurrence is shown during burst B and is labeled "early" beneath signal INT.

Shown also is signal HOLD generated by the demodulator control logic 56 and provided along line 64 to track-and-hold amplifier 46. When signal HOLD is low, the track-and-hold amplifier 46 is in track mode, and when signal HOLD is high, the track-and-hold amplifier 46 is in hold mode (as described above). Signal HOLD is low while signal INT is high (during integration) and signal HOLD goes high one full cycle after signal INT goes low causing the integrator output voltage to be held by the track-and-hold amplifier 46. (As described above, the track-and-hold amplifier holds the voltage by charging the capacitor $C_H$ to an equal or proportional charge to that on the integrating capacitor $C_{INT}$.) To insure that the track-and-hold amplifier correctly acquires an equal or proportional charge on its capacitor $C_H$ to the integrated charge, the demodulator control logic waits one full cycle of the ZCD output (i.e., one full cycle of the input burst) after signal INT goes low before signal HOLD is made high. In addition, after signal HOLD goes high, a further minimum of one half-cycle of the ZCD output occurs before signal CTRL goes low. This delay occurs so that the voltage is adequately held by the track-and-hold amplifier 46 prior to the discharging of the charge on the integrating capacitor $C_{INT}$.

For each burst, once the area voltage is held by the track-and-hold amplifier 46, that voltage is converted by the ADC 26 and the digital output signal is stored in the appropriate register 30A–30D of the register stack 30. After signal HOLD goes high, the ADC 26 waits a short period of time for the track-and-hold amplifier to settle before beginning conversion. The conversion process continues after signal HOLD goes low. As will be understood by those skilled in the art, a typical multi-bit conversion occurs in separate phases, each phase for converting a different group of bits.

In the preferred pipelined scheme, as seen in the timing diagram of FIG. 4, the ADC 26 converts the voltage output by track-and-hold amplifier 46 corresponding to burst A while the integrator is integrating the rectified current corresponding to burst B. Similarly, the voltage corresponding to burst B is converted by the ADC while the integrator 20 is integrating the rectified current corresponding to burst C. Such a process of integrating a first burst and then converting that burst while integrating a subsequent burst, is referred to herein as a "pipelined" demodulation and conversion scheme. The pipelined demodulation and conversion scheme offers the advantage that the delay between integration and conversion is minimized such that the head position correction occurs quickly; that is, the servo bandwidth is higher and settling time is shorter.

After conversion of each burst, the status register stores a word, certain bits of which determine whether an accurate demodulation and conversion has occurred. If an inaccurate demodulation and conversion has occurred for any of the bursts, the process can be repeated.

Figure 5:
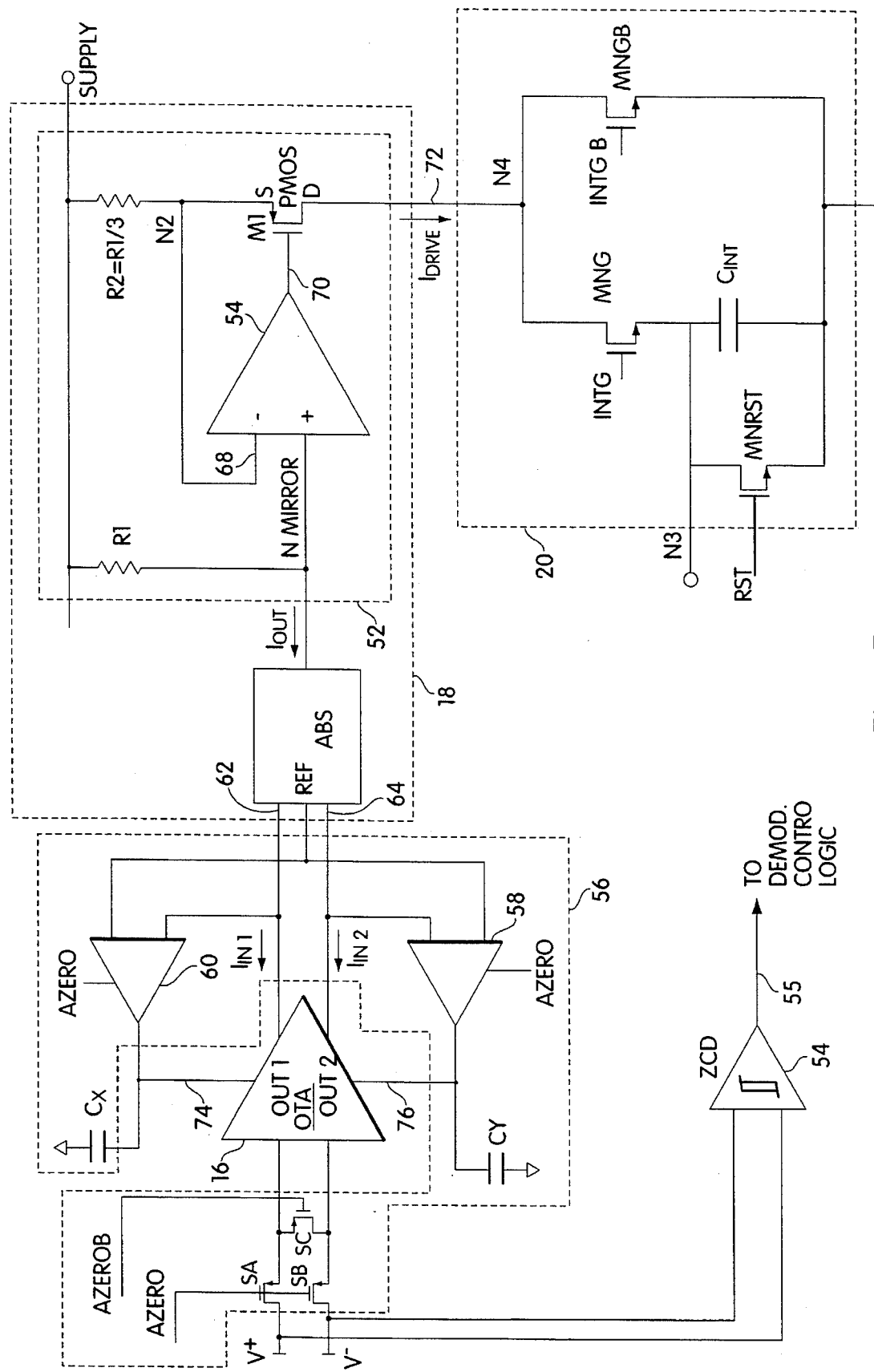
FIG. 5 is a partial schematic, partial block diagram of a particular embodiment of the demodulation circuit according to the present invention.

FIG. 5 shows, in more detail, the area detect circuitry according to the present invention. As shown, the area detect circuitry 15 includes OTA 16, ZCD 54, full-wave rectifier 18, and integrator 20. Also shown is an auto-zero circuit 56 which operates to calibrate and compensate for any offset errors associated with the OTA operational amplifier 16. The area detect circuitry operates in a normal mode and in a calibration mode. During normal mode operation, the four bursts are received and demodulated; during calibration mode operation, the auto-zero circuit 56 operates to compensate for any offset voltage errors associated with the OTA 16. Preferably, the calibration occurs once before each set of four bursts is demodulated.

The rectifier 18 includes an absolute value circuit ABS 50 and a current mirror circuit 52. In theory, ABS 50 receives as inputs the current output of OTA 16 along lines 62 and 64, and produces a rectified current output $I_{OUT}$ along line 66 to current mirror circuit 52. As will be described in greater detail below, in actuality OTA 16 induces the currents $I_{in1}$ and $I_{in2}$ to flow along lines 62 and 64 to nodes OUT1 and OUT2 respectively of OTA 16. ABS 50 acts to half-wave rectify each of currents $I_{in1}$ and $I_{in2}$ to produce the full-wave rectified $I_{OUT}$ along line 66, which current is then input to current mirror 52.

The current mirror 52 acts to provide an output signal $I_{DRIVE}$ for charging the integration capacitor $C_{INT}$. $I_{DRIVE}$ is a multiple in amplitude of $I_{OUT}$ but of different polarity. The current mirror circuit includes an operational amplifier 54, and a transistor M1, preferably a PMOS transistor.

The gate of transistor M1 is connected along line 70 to the output lead of operational amplifier 54. The source of transistor M1 is connected along line 68 to the inverting input terminal of operational amplifier 54. The drain of transistor M1 is connected along line 72 to integrator 20.

The current mirror 52 also includes a gain circuit consisting of resistors R1 and R2. Resistor R1 is connected between the supply terminal SUPPLY (receiving the positive supply voltage) and the non-inverting input terminal of operational amplifier 54. Resistor R2 is connected between the supply terminal SUPPLY and the source of transistor M1. Resistor R1 preferably has a resistance value three times greater than that of resistor R2.

The current $I_{OUT}$ flows from the supply voltage terminal through resistor R1 and along line 66 into the ABS 50. The operational amplifier 54 operates to maintain equal the voltage at node $N_{MIRROR}$ and the voltage at node N2. Therefore, the voltage across resistor R1 is equal to the voltage across resistor R2. Because the resistance value of resistor R1 is three times that of resistor R2, the current $I_{DRIVE}$ flowing from the supply terminal and through resistor R2 has an amplitude three times that of current $I_{OUT}$. Thus, the ratio of the resistance values controls the gain of the current mirror circuit. That ratio can be set according to application requirements.

The operational amplifier 54 produces an output voltage at line 70 which is the gate voltage of transistor M1. When transistor M1 is turned on, the current $I_{DRIVE}$ flows through the source and drain nodes of transistor M1 and then to integrator 20. This architecture of the mirror circuit including an operational amplifier, transistor and gain circuit with two resistors, insures that the gain remains substantially constant and, therefore, that the output $I_{DRIVE}$ has good linearity. The particular circuitry for realizing the operational amplifier is not critical, just that the operational amplifier produces adequate gain and bandwidth. By contrast with certain prior art current mirror circuits in which a mismatch in transistors results in the gain varying with the signal level, any mismatch in the resistance values of the resistors of the mirror circuit of the present invention simply produces a slightly different gain value, but that gain value remains constant with signal level.

Integrator 20 includes integration capacitor $C_{INT}$ and transistors MNG, MNGB and MNRST, preferably NMOS transistors. The capacitor $C_{INT}$ is connected across node N3 and ground. The drain of transistor MNG is connected to node N4 and the source of transistor MNG is connected to node N3. Transistor MNG receives gate control signal INTG. The drain of transistor MNGB is connected to node N4 and the source of transistor MNGB is connected to ground. Transistor MNGB receives gate control signal INTGB. The drain of transistor MNRST is connected to node N3 and the source of MNRST is connected to ground. Transistor MNRST receives gate control signal RST (discussed above).

The integrator integrates as described above with current signal $I_{DRIVE}$ charging capacitor $C_{INT}$. To begin integrating a burst signal, signal INTG goes high, turning on transistor MNG such that signal $I_{DRIVE}$ flows along line 72, through transistor MNG to charge capacitor $C_{INT}$. After capacitor $C_{INT}$ is charged for that burst signal, signal INTG then goes low, turning off transistor MNG. Shortly thereafter, signal INTGB goes high, turning on transistor MNGB such that signal $I_{DRIVE}$ flows from line 72 through transistor MNGB to ground. It is important that signal INTG goes low before signal INTGB goes high. Otherwise, both transistors MNG and MNGB would be on simultaneously and capacitor $C_{INT}$ would be shorted to ground. Preferably, signal INTG is produced as an input to an inverter element (not shown) and signal INTGB is produced as the output from that inverter element, the propagation delay of the inverter causing the delay between the Two signals.

While transistor MNG is off and transistor MNGB is on, and after the appropriate track-and-hold amplifier is in hold mode (as described above), signal RST goes high, turning on transistor MNRST. This shorts the plates of capacitor $C_{INT}$ to discharge capacitor $C_{INT}$ and reset integrator 20.

When the next burst signal is available for integration, signal RST goes low, turning off transistor MNRST. Then, signal INTG goes high, turning on transistor MNG. Thereafter, signal INTGB goes low, turning off transistor MNGB and the integrator begins integrating. It is important that signal INTG goes high before signal INTGB goes low to avoid causing a transient on node N4 resulting in inaccurate integration performance.

The ZCD 54 operates as described above. The ZCD comparator has hysteresis because the output of the ZCD reinforces the input so that the output will have a certain level of immunity to input noise. This arrangement (not shown) of the ZCD enables the ZCD to avoid counting spurious zero-crossing signals.

Auto-zero circuit 56 includes operational amplifiers 58 and 60. Operational amplifier 58 receives as inputs the voltage on line 64 (corresponding to current $I_{in2}$) and a reference voltage produced within ABS 50 at node REF. Similarly, operational amplifier 60 receives as inputs the voltage on line 62 (corresponding to current $I_{in1}$) and the same reference voltage. Each of the operational amplifiers 58 and 60 is controlled by the control signal AZERO such that both op amps operate during auto-zero mode and do not operate during normal operation. During auto-zero mode, switches SA, SB, SC are controlled by AZERO and AZEROB to disconnect the inputs $V_{in+}$ and $V_{in-}$ from the OTA and to connect two input nodes of the OTA together. Capacitors CX and CY store the auto-zero voltage when in normal operating mode. During auto-zero mode, op amps 58 and 60 compare the two inputs and provide a control signal along lines 76 and 74, respectively, to OTA 16 representing any offset error associated with OTA 16. The control signal causes OTA offset correction circuitry (not shown) to correct for the offset error voltage. The reference voltage should be equal to the voltage on lines 62 and 64 if there is no offset error. The operational amplifiers 58 and 60 operate to equalize the voltages on their positive and negative inputs.

The auto-zero circuit is not part of the present invention and is not described in detail herein as any conventional auto-zero circuit, which corrects offset voltage errors, can be used and should be readily known by those skilled in the art.

Figure 6:
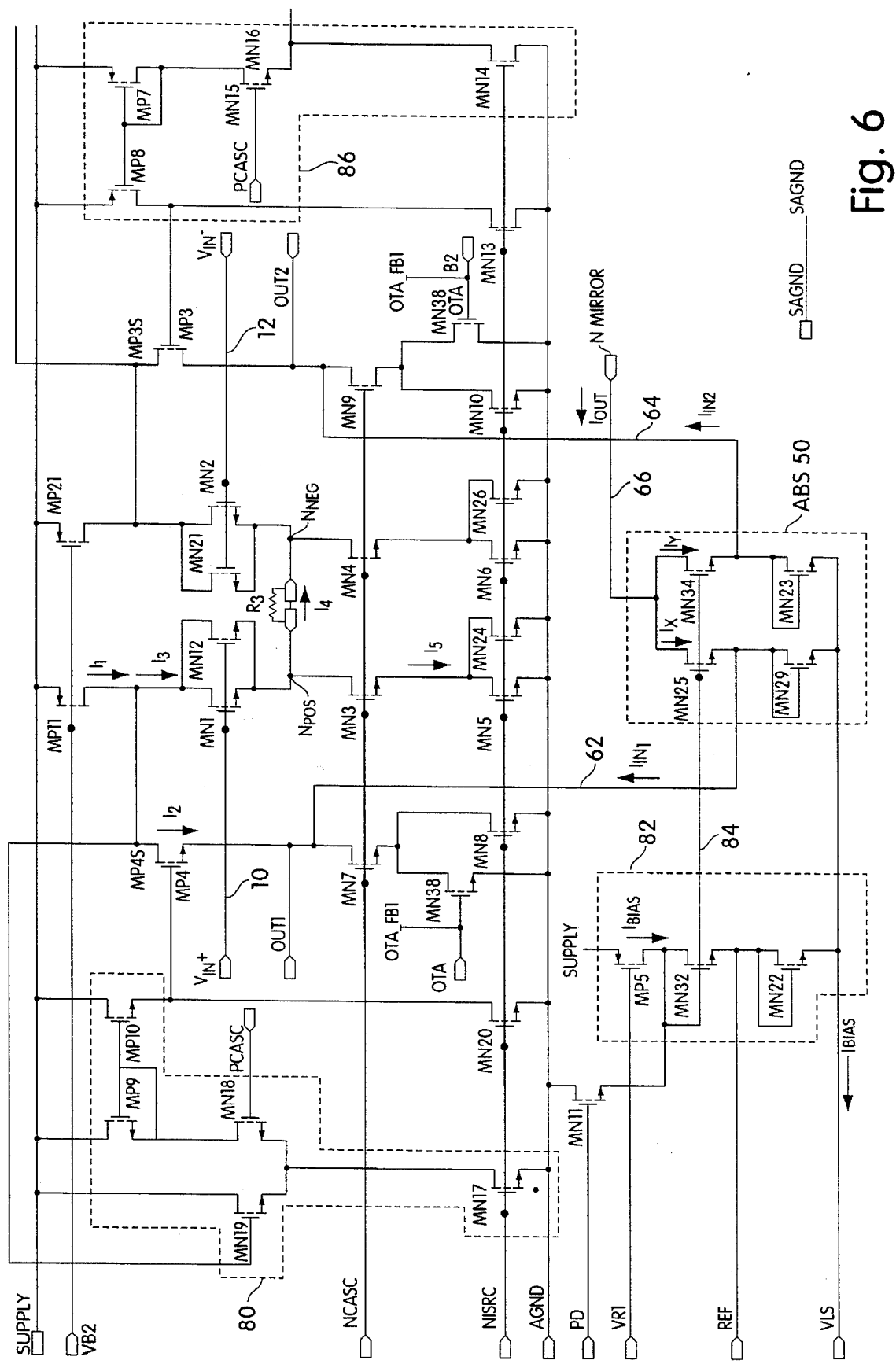
FIG. 6 is a schematic diagram of the demodulation circuit of FIG. 5.

FIG. 6 is a detailed schematic diagram of the ABS 50 and OTA 16. As shown, ABS 50 includes NMOS transistors MN25, MN29, MN34 and MN23 and bias transistors MP5, MN32, MN22 and powerdown transistor MN11. The remainder of the circuitry shown in FIG. 6 is the OTA 16. During operation, a voltage imbalance in the OTA 16, caused by the receipt of the differential voltage from an input signal burst, causes current $I_{OUT}$ to flow from the current mirror circuit starting at node $N_{MIRROR}$ in FIG. 6, to the ABS 50. A voltage imbalance in the OTA induces differential currents $I_{in1}$ and $I_{in2}$ to flow in the ABS 50 which, in turn, induces current $I_{OUT}$ to flow from the current mirror circuit. As used herein, the term "induce" means to cause and is unrelated to an electrical inductance.

The PMOS transistor MP5 and NMOS transistors MN32 and MN22 act together as a bias leg circuit 82 for providing a bias voltage on line 84 to ABS 50. Assume that currents $I_{in1}$ and $I_{in2}$ are both zero for the discussion of the bias of the absolute value circuit. As shown, the source of transistor MP5 is connected to the drain of transistor MN32 and the source of transistor MN32 is connected to the drain of transistor MN22. The source of transistor MN22 is connected to node VLS. The source of transistor MP5 is connected to node SUPPLY for receiving a supply voltage and the gate of transistor MP5 is connected to node VB1 for receiving a bias voltage. Current $I_{bias}$ flows from the supply terminal through transistors MP5, MN32 and MN22 to node VLS. Because the bias voltages and the sizes of the transistors are known, a known voltage drop across MN32 and MN22 is created.

The gate of transistor MN32 is connected to the gate of transistor MN25 so as to bias the ABS 50. As shown in the schematic diagram, transistors MN25 and MN29 are a factor of ten smaller in width than transistors MN32 and MN22 so that the amount of bias current $I_{bias}$ flowing through transistors MN32 and MN22 is a factor of ten greater than the bias current flowing through transistors MN25 and MN29. Similarly, transistors MN34 and MN23 are a factor of ten smaller in width than transistors MN32 and MN22 so that the amount of current flowing through transistors MN34 and MN23 is a factor of ten less than current $I_{bias}$.

Due to the bias leg circuit 82, the gate voltage of transistor MN25 remains substantially constant. It is important that the transistors of ABS 50 are biased with a relatively low current in order to balance the need for a fast turn-on time of the transistors (which is faster with a higher bias current) and a low offset error (which is lower with a lower bias current). A preferred value for the bias current $I_{bias}$ is about 3 µA. The bias current can, however, be changed to suit a particular application. In addition, the relative sizes of the transistors in the ABS 50 to those of the bias leg circuit 82 can also be modified to suit a particular application.

As stated earlier, a difference in the voltages $V_{IN}+$ and $V_{IN}-$, received on lines 10 and 12 respectively, induces currents $I_{in1}$ and $I_{in2}$ to flow along lines 62 and 64. Those currents, in turn, induce current $I_{OUT}$ to flow from node $N_{MIRROR}$ to ABS 50. Currents $I_{in1}$ and $I_{in2}$ are of opposite polarity. As the left side of the OTA circuitry, receiving current $I_{in1}$, is identical to the right side of the OTA circuitry, receiving current $I_{in2}$, only the operation of the circuitry on the left side of the OTA will be described.

PMOS transistor MP11 acts as a current source for generating current $I_1$. Transistor MP11 is preferably implemented with multiple transistors connected in parallel. The source of transistor MP11 is connected to node SUPPLY for receiving the supply voltage. The gate of transistor MP11 is connected to node VB2 for receiving a bias voltage. Current $I_1$ flows from the source to the drain of transistor MP11. A portion $I_3$ of current $I_1$ flows through NMOS transistors MN1 and MN12 and the remainder $I_2$ of current $I_1$ flows through PMOS transistor MP4. A portion $I_4$ of current $I_3$ will flow from node $N_{POS}$ to node $N_{NEG}$ through resistor $R_3$ upon receipt of an input signal burst, and the remainder $I_5$ of current $I_3$ flows through NMOS transistor MN3. The value of resistor $R_3$ is used to set the transconductance of the OTA.

Transistor MP4 acts as a current source. The gate of transistor MP4 is driven by operational amplifier 80 and the drain of transistor MP4 is connected to node OUT1. Operational amplifier 80 consists of PMOS transistors MP9 and MP10 and NMOS transistors MN18 and MN19 and MN17. The source of transistor MP4 is connected to the gate of transistor MN19 and the gate of transistor MP4 is connected to the drain of transistor MP10. Such an arrangement of biasing the gate of transistor MP4 with the output of operational amplifier 80 maintains a relatively high output impedance of the OTA. This technique is called cascode boosting and is well known to those skilled in the art. By maintaining the output impedance of the OTA relatively high in comparison with the input impedance of the ABS, output signal linearity is insured, as will be described in greater detail below.

NMOS transistor MN7 acts as a current sink. The gate of transistor MN7 is connected to node NCASC for receiving a gate bias voltage. The drain of transistor MN7 is connected to the drain of transistor MP4 and to the source of transistor MN25. Transistor MN7, receives the sum of currents $I_2$ from transistor MP4 and $I_{in1}$ from ABS 50. Any imbalance created by the receipt of a burst signal causes current $I_4$ to change which, in turn, alters current $I_3$. The change in current $I_3$ alters current $I_2$. When current $I_2$ changes, the current sink MN7 induces current $I_{in1}$ from the ABS to change, This action, in turn, causes the ABS 50 to induce a change in current $I_{OUT}$ received from the current mirror circuit. Such operation will be described in greater detail below.

The following example should help illustrate operation of the OTA and ABS circuitry. Assume that current $I_1$ is equal to 600 μA and each of currents $I_2$ and $I_3$ is equal to 300 μA. Also, assume that current $I_5$ is equal to 300 μA and that transistor MN7 receives (and sinks) 300 μA. If the burst signal received is such that $V_{IN+}$ is equal to $V_{IN-}$, then the voltage at node $N_{POS}$ will be equal to the voltage at node $N_{NEG}$ and current $I_4$ flowing through resistor $R_3$ will be zero. If, however, due to the receipt of an input burst signal, the voltage $V_{IN+}$ increases and the voltage $V_{IN-}$ decreases such that a 6 mv difference appears between nodes $N_{POS}$ and $N_{NEG}$, then current $I_4$ will be equal to 1 μA, assuming resistor $R_3$ is equal to 6Ωμ.

When current $I_4$ increases from zero to 1 μA, current $I_3$ flowing through transistors MN1 and MN12 increases to 301 μA. Because current $I_1$ from current source MP11 stays constant at 600 μA, current $I_2$ decreases to 299 μA. The decrease in current $I_2$ creates an imbalance as the current sink MN7 looks to receive 300 μA. With the reduction in current $I_2$, the source voltage of transistor MN25 falls. The resulting increase in the gate-source voltage of transistor MN25 causes transistor MN25 to carry current $I_{in1}$ from its drain to its source. This action induces current $I_{OUT}$ to flow into ABS 50 and current $I_{in1}$ to flow from the drain to the source of transistor MN25 and through line 62 to transistor MN7. In this example, current $I_{in1}$ will be equal to 1 μA.

As another example, assume that the voltage $V_{in+}$ decreases and the voltage $V_{in-}$ increases such that a −6 mV difference appears between nodes $N_{POS}$ and $N_{NEG}$. Then current $I_4$ will be equal to −1 μA. When current $I_4$ decreases from zero to −1 μA, current $I_3$ flowing through transistors MN1 and MN12 decreases to 299 μA. Because current $I_1$ flowing from current source MP11 stays constant at 600 μA, current $I_2$ increases to 301 μA. The increase in current $I_2$ creates an imbalance as the current sink MN7 looks to receive 300 μA. With the increase in current $I_2$, the gate-source voltage of transistor MN29 increases causing transistor MN29 to carry a current from its drain to its source. The value of the current will be equal to 1 μA and will flow from node OUT1 through the drain and source of transistor MN29 and to node VLS. In this example, no current $I_{OUT}$ results.

Figure 7:
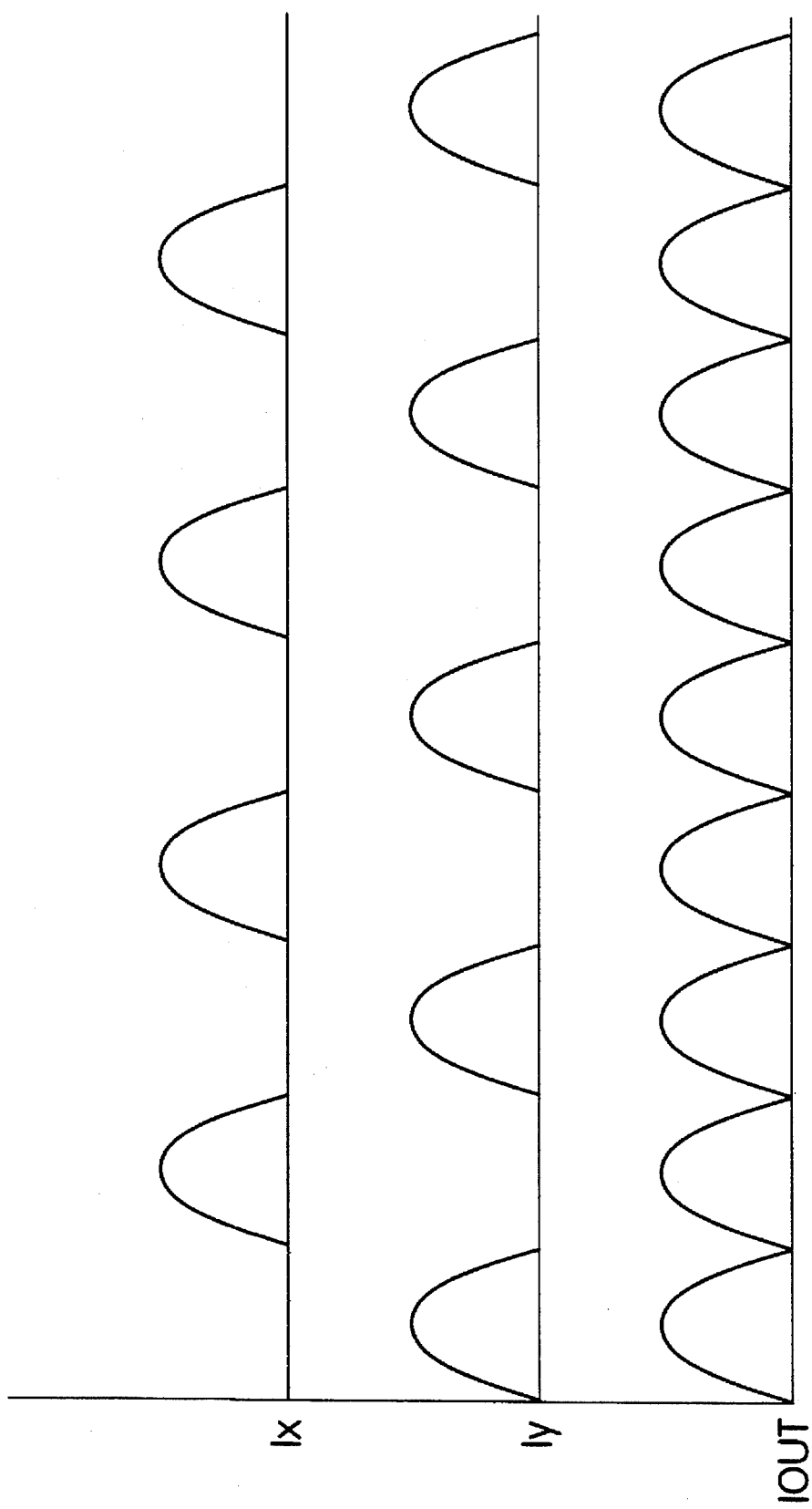
FIG. 7 is a timing diagram of signals noted in the schematic diagram of FIG. 6.

The right side of the OTA circuitry of FIG. 6 operates similarly to induce current $I_{in2}$ to flow along line 64 to current sink transistor MN9. Again, the voltage imbalance at nodes $N_{POS}$ and $N_{NEG}$, caused by receipt of an input burst signal, induces current $I_4$ to flow which, in turn, induces a current $I_{in2}$ to flow from ABS 50. The operation of MN25 and MN34 is such that the current $I_{OUT}$ in 66 is unidirectional although currents $I_{in1}$ and $I_{in2}$ are bidirectional. In fact, the transistors MN25 and MN39 and the transistors MN34 and MN23 operate as two separate half-wave rectifiers. The currents in MN25 and MN34 are then added to form the current IOUT. IOUT is a full-wave rectified current because the two half-wave rectified currents are related as shown in FIG. 7. Currents Ix and Iy are identified in FIG. 6 and IOUT=Ix+Iy.

The arrangement of transistors MP11, MP4, MN1 and MN12 are referred to herein as a "folded cascode" arrangement. It should be understood that the right side of the OTA circuitry also includes a folded cascode arrangement of transistors MP21, MP21, MN2 and MP3.

As will be understood by those skilled in the art, it is important for producing an output signal having good linearity that the input impedance to the ABS circuit remain relatively low (in comparison to the OTA output impedance) and that the input impedance of the ABS remain independent of input signal level. As the NMOS transistors of the ABS circuit have current-dependent impedances, the input impedance to the ABS circuit is non-linear. By making the OTA output impedance relatively high compared to the input impedance of the ABS, any non-linearity error contributed by the ABS circuit will be significantly reduced. As described above, by biasing transistor MP4 with operational amplifier 80 and by biasing transistor MP3 with operational amplifier 86, the output of impedance of the OTA is maintained relatively high. Transistors MP3 and MP4 can be relatively small sizes due to the cascode boost. Smaller transistors have less parasitic capacitance. Lower parasitic capacitance on MP34 means lower OTA output capacitance which means higher output impedance.

It should be appreciated that while the OTA and ABS were described with reference to particular PMOS and NMOS transistors of noted sizes, such parameters could be changed to suit a particular application. Additionally, the current values listed were intended only as exemplary.

It should also be understood while that the example shown and described above included four input signal bursts and the number of cycles over which the integrator should integrate was four, such parameters are provided by the user and could be changed without altering the pipelined demodulation and conversion scheme of the present invention.

In addition, while the ADC, DAC and registers were shown and described herein as 10-bit converters and registers, and the lines interconnecting such elements were 10-bit buses, those skilled in the art should appreciate that different resolution converters and different word-length registers are suitable.

While there have been shown and described what are at present considered the preferred embodiments of the present invention, which have been disclosed by way of example only, it should be obvious to those skilled in the art that various changes and modifications can be made therein without departing from the spirit and scope of the invention as presented above and as defined by the appended claims and equivalents thereto. For example, the timing relationship between signal CTRL, signal INT and the ZCD output signal could be changed so long as the integrator 20 accurately integrates over the correct number of pre-programmed cycles. Similarly, the timing relationship between the start of the HOLD cycle and the analog-to-digital conversion process could be altered to suit a particular application. Further, while the input was shown and described in a differential arrangement, those skilled in the art will appreciate that a single-ended input could be used. Those skilled in the art should also appreciate that it is not necessary, with the scheme of the present invention, to integrate over an integer number (or a fraction such as ½) of cycles of the input burst.

In addition, it is not necessary to use an absolute value circuit consisting of two half-wave rectifiers. One or two separate full-wave rectifiers could be used.

Also, it is not necessary to use a current mirror circuit if the integrating capacitor $C_{INT}$ can be charged with respect to the positive supply instead of with respect to ground.

Further, it is not necessary to use a current mirror circuit if PMOS transistors are used in the absolute value circuit as this will result in a current source output from the absolute value circuit instead of the current sink output described earlier.

What is claimed is:

1. Demodulation circuitry for demodulating a plurality of input signal bursts of a burst pattern comprising:

an input sequentially receiving the plurality of input signal bursts;

translation circuitry, coupled to the input, for sequentially translating each input signal burst to a translated current;

a rectifier circuit, coupled to the translation circuitry for sequentially rectifying each translated current and producing a rectified driving signal; and an integrator, coupled to the rectifier circuit, for sequentially integrating each rectified driving signal.

2. Demodulation circuitry as claimed in claim 1 wherein the rectifier circuit includes:

an absolute value circuit, coupled to the translation circuitry, for rectifying each translated current; and a current mirror circuit, coupled to the absolute value circuit, for reversing the polarity of each rectified translated current to produce the rectified driving signal current.

3. Demodulation circuitry as claimed in claim 2 wherein the current mirror circuit includes:

an operational amplifier, coupled to the absolute value circuit;

a feedback network consisting of a first resistor and a transistor; and a second resistor to translate the current from the absolute value circuit to a voltage.

4. Demodulation circuitry as claimed in claim 1 wherein the translation circuitry includes a folded cascode circuit arrangement of a plurality of CMOS transistors.

5. A method for demodulating a plurality of input signal bursts of a burst pattern comprising the steps of:

receiving the plurality of input signal bursts of the burst pattern;

sequentially translating each input signal burst to a translated current;

sequentially rectifying each translated current and producing a rectified driving signal; and sequentially integrating each rectified driving signal.

6. A method as claimed in claim 5 wherein the step of sequentially rectifying includes the step of sequentially rectifying each translated current with an absolute value circuit and a current mirror circuit.

7. Demodulation circuitry as claimed in claim 1 wherein all elements of the demodulation circuitry are implemented in CMOS technology.

\* \* \* \* \*